March 19, 1957  A. R. HAMILTON  2,786,181
ABSORPTION OF RADIO FREQUENCY ENERGY
Filed Aug. 24, 1953  2 Sheets-Sheet 1

INVENTOR.
ALLEN R. HAMILTON
BY James B. Christie
ATTORNEY

March 19, 1957  A. R. HAMILTON  2,786,181
ABSORPTION OF RADIO FREQUENCY ENERGY
Filed Aug. 24, 1953  2 Sheets-Sheet 2
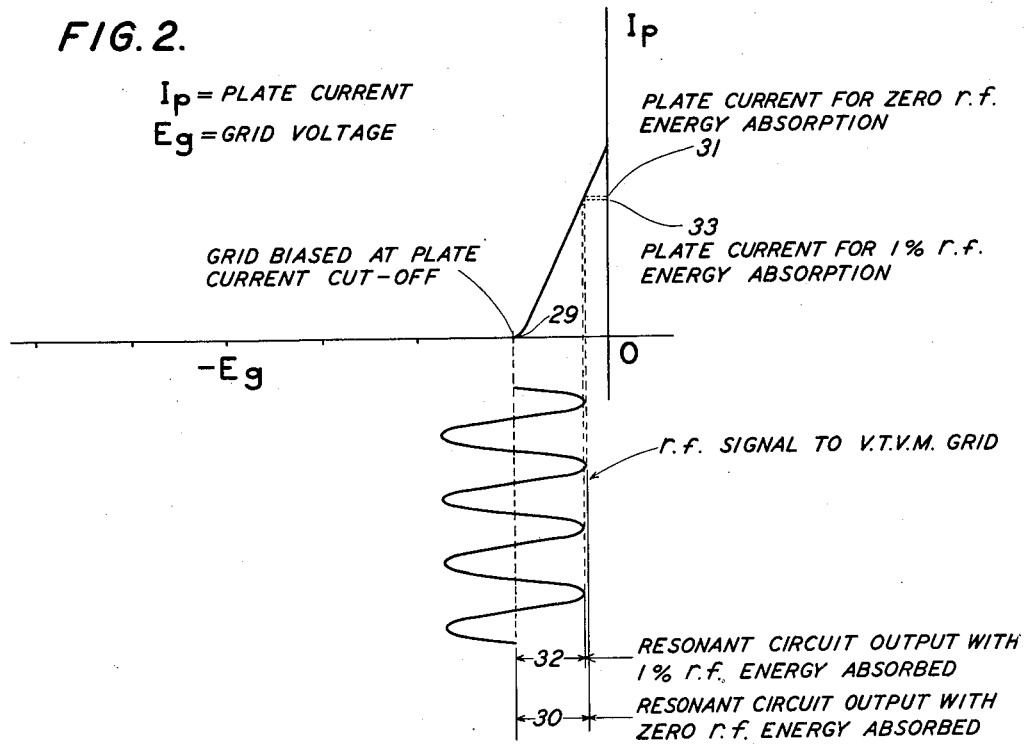
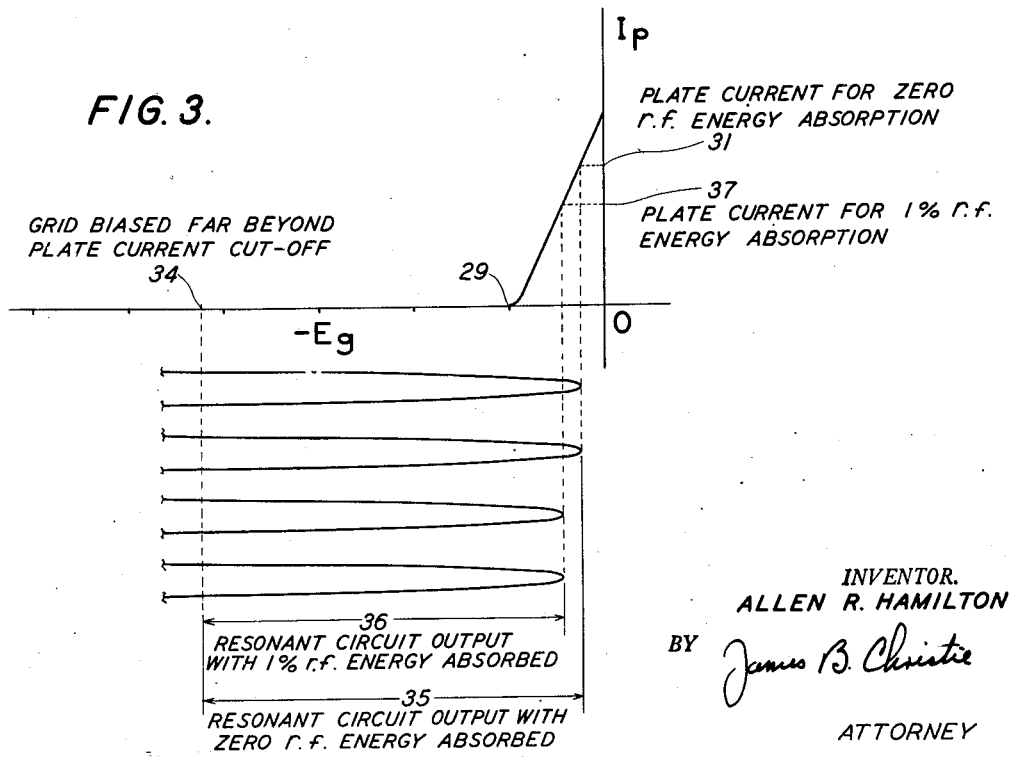
INVENTOR.
ALLEN R. HAMILTON
BY James B. Christie
ATTORNEY

United States Patent Office 2,786,181
Patented Mar. 19, 1957

2,786,181

ABSORPTION OF RADIO FREQUENCY ENERGY

Allen R. Hamilton, Rochester, N. Y., assignor, by mesne assignments, to Consolidated Electrodynamics Corporation, Pasadena, Calif., a corporation of California Application August 24, 1953, Serial No. 376,222

8 Claims. (Cl. 324—61)

This invention relates to electrical apparatus for measuring the amount of R. F. energy absorbed by a sample from a resonant circuit. More specifically it provides an improved circuit of the Q-meter type with greatly increased sensitivity for accurate measurement of minute changes of Q in a resonant circuit due to the presence of the sample in inductive relationship with the circuit. It finds its principal application in measuring the concentration of a known material dissolved or dispersed in the sample.

The Q of a resonant circuit is a figure of merit assigned to the circuit, and it is commonly defined by the following equation:

$$Q = \frac{X}{R} \quad (1)$$

where:

$X$ = the reactance of the circuit
$R$ = the resistance of the circuit.

It is common practice to measure the Q of resonant circuits with conventional Q-meters consisting of a radio frequency generator connected to the resonant circuit whose Q is to be measured, and a vacuum tube voltmeter for measuring voltages developed in the resonant circuit. The voltage output of the radio frequency generator is known or measured, and the voltage developed across either a capacitor or an inductance in the resonant circuit is measured with the vacuum tube voltmeter. The voltage developed across either component (capacitor or inductor) of the resonant circuit is equal to the product of the Q of the circuit and the voltage applied from the radio frequency oscillator. Thus the measurement of voltage developed across the capacitor in a series resonant circuit, for example, permits ready calculation of the Q of the circuit from the equation:

$$Q = \frac{E_2}{E_1} \quad (2)$$

where:

$E_1$ = the voltage applied by the R. F. generator to the resonant circuit
$E_2$ = voltage measured across the capacitor.

An important feature of a Q-meter is the use of a vacuum tube voltmeter which is capable of measuring alternating voltages without requiring any appreciable power from the voltage being measured. My invention provides an improved Q-meter circuit in which the sample under test is brought within the radio frequency field existing in the resonant circuit so as to absorb R. F. energy from the circuit and thus induce a change in the Q of the resonant circuit. The Q of a resonant circuit is proportional to the ratio of the amount of R. F. energy stored in the circuit to the amount of R. F. energy dissipated in the circuit during one cycle. The amount of radio frequency energy absorbed by the sample is a function of the composition of the sample, and the absorption of radio frequency energy causes a lowering of the Q of the circuit. As can be seen from equation (2), the lowering of the Q of the circuit while the applied voltage from the R. F. generator is held constant will result in a reduced reading of the vacuum tube voltmeter connected across one of the components of the resonant circuit. The change in the reading of the vacuum tube voltmeter is a function of the amount of R. F. energy absorbed by the sample and hence is a function of the composition of the sample.

Conventional Q-meters are satisfactory for measuring relatively large changes in Q, but are not sufficiently sensitive to detect the relatively small amounts of R. F. energy absorbed by many samples. For example, my experiments show that presently available Q-meters are incapable of detecting a concentration of hydrochloric acid in distilled water to the amount of $10^{-6}$ moles per liter, yet my circuit is capable of measuring this and much smaller concentrations. The insensitivity of the conventional Q-meter circuits is due to the fact that the vacuum tube voltmeters which they employ are designed to operate within the normal voltage ratings of the voltage detector tubes used. A small change in the Q of the test circuit results in a proportionally small change in the voltage appearing across the vacuum tube voltmeter terminals. Such voltage changes may be so small as to be undetectable in conventional circuits.

If a sample which is to be analyzed absorbs only a small portion (for example, 1%) of the total R. F. energy stored in the resonant circuit, then the resultant voltage change as read on a conventional vacuum tube voltmeter would be in the same proportion. Such a small change is undetectable with conventional instruments when attempting to distinguish between samples absorbing very small amounts of R. F. energy. My invention provides a means whereby changes in the R. F. energy absorbed by such samples in a series resonant circuit (and the resulting changes in circuit Q) can be easily detected and measured. This is accomplished by imposing an abnormally large negative bias on the control grid of the V. T. V. M. detector tube. This permits the application of a large amount of R. F. energy to the resonant circuit without causing the control grid of the detector tube to be driven positive during the measurment. This is particularly important because if the control grid of a vacuum tube voltmeter is driven positive, it no longer is a high impedance device of the type required for Q-meter circuits.

My invention contemplates the provision of an improved Q-meter circuit suitable for measuring the amount of R. F. energy absorbed by a sample disposed in an inductive relationship with a resonant circuit comprising the combination of a radio frequency generator capable of variable power output, a resonant circuit connected to the output of the R. F. generator, means for tuning the resonant circuit, a vacuum tube voltmeter connected across the resonant circuit and having a control grid and a plate circuit, means for biasing the control grid of the vacuum tube to a negative value beyond its normal cut-off bias, a current meter connected in the plate circuit of the tube, means for varying the power output of the R. F. generator sufficient to overcome the negative bias on the vacuum tube and cause plate current to pass through the meter to give a relatively large measurement with no sample in inductive relationship with the resonant circuit so that the plate current will decrease substantially when a sample which absorbs R. F. energy is placed in inductive relationship with the resonant circuit. I have found that satisfactory analysis can be made with the sample disposed in the circuit to absorb R. F. energy from either the capacitor or inductor of the resonant circuit, and I use the term "inductive relationship" to mean either of these two positions.

These and other aspects of the invention will be more thoroughly understood in the light of the following detailed description taken in conjunction with the accompanying drawings in which:

Fig. 2 illustrates operating conditions for a detector tube in a vacuum tube voltmeter employed in a conventional Q-meter circuit; and Fig. 3 illustrates operating conditions for the detector tube as used in the present invention.

Figure 1:
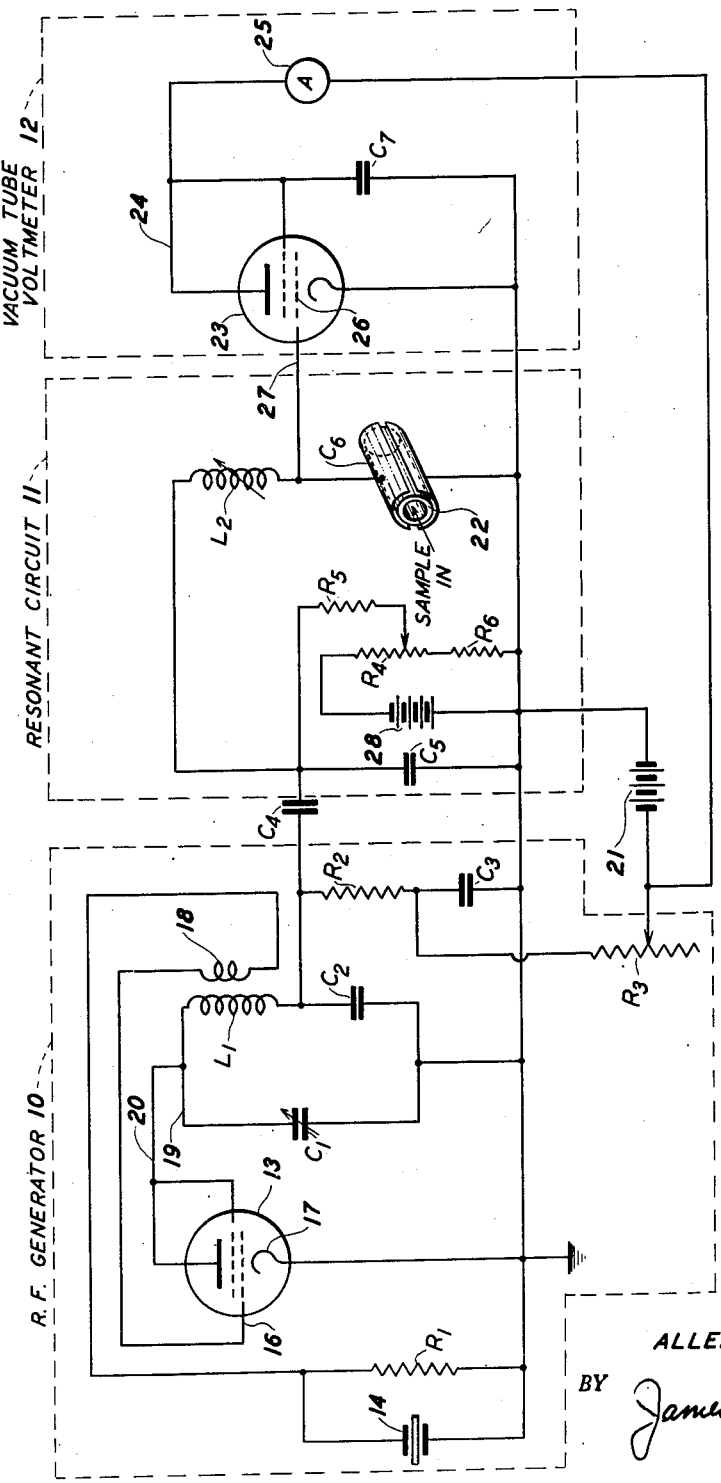
Fig. 1 is a wiring diagram showing a preferred form of the apparatus of the invention.

Referring to Fig. 1, the principal elements of the apparatus are a radio frequency generator 10, a resonant circuit 11, and a vacuum tube voltmeter 12. The radio frequency generator is a crystal oscillator circuit having a tuned-grid tuned-plate arrangement. CK–5672 tetrode vacuum tube 13 is used as an oscillator tube. A crystal 14 in parallel with a resistance $R_1$ is connected between a control grid 16 and a cathode 17 of the tube to make up the tuned-grid circuit. A "tickler" coil 18 is connected in series with the tuned-grid circuit to insure continuous oscillation of the tube. A tank circuit 19 having an inductor $L_1$, a variable capacitor $C_1$ and a fixed capacitor $C_2$ is connected in series in a plate circuit 20 of the oscillator tube. The inductor is positioned in inductive relationship with the tickler coil to insure adequate feedback to the grid of the tube. A resistor $R_2$ and a capacitor $C_3$ in series connect a point in the circuit between the inductor and fixed capacitor of the tank circuit to the ground to reduce the effect of R. F. voltage on the battery circuit. A rheostat $R_3$ is connected in the plate circuit of the oscillator tube to control the amount of power delivered by the R. F. generator by controlling the amount of current supplied to the plate circuit from a plate supply battery 21. The output of the radio frequency generator is capacity-coupled to the resonant circuit through a capacitor $C_4$. A capacitor $C_5$ is connected across the output of the R. F. generator to provide for additional stability of R. F. voltage applied to the resonant circuit. The resonant circuit consists of a variable inductor $L_2$ in series with a capacitor $C_6$ adapted to contain a sample holder 22 into which a sample is placed or through which a sample is passed. For convenience the sample holder is a plastic tube or sleeve. The vacuum tube voltmeter consists of a detector tube 23 (CK–5672 tetrode vacuum tube) connected in a plate circuit 24 to an ammeter 25. The normal cut-off bias of the detector tube is about −8 volts. A condenser $C_7$ is provided between the plate and a cathode of the tube for by-passing of the plate circuit to alternating currents. The input of the vacuum tube voltmeter is a control grid 26 of the detector tube and is connected across the capacitor of the resonant circuit by an electrical lead 27. A potentiometer $R_4$, $R_5$, $R_6$ powered by a biasing battery 28 is connected to the control grid of the detector tube, and is used to apply a large negative bias to the control grid. The value of this negative bias is of the order of five to ten times greater than the normal cut-off bias of the vacuum tube, depending upon the degree of sensitivity desired. The term "normal cut-off bias" is employed here to mean that negative bias required to be imposed on the control grid of the vacuum tube to prevent any current from flowing on the plate circuit of the vacuum tube when the vacuum tube is being operated at normal filament and plate voltages. For the sake of simplicity the details of the various switches and filament power supplies of standard Q-meter circuits are not illustrated in Fig. 1.

In order to obtain a clear idea of the values of the various components employed in the circuit, attention should be directed to the following table:

Table

| Capacitors | Resistors | Inductors |
|---|---|---|
| $C_1$—40–100 mmfd. | $R_1$—100K ohms | $L_1$—4 mH. |
| $C_2$—750 mmfd. | $R_2$—470 ohms | $L_2$—20–50 mH. |
| $C_3$—5000 mmfd. | $R_3$—100K ohms | |
| $C_4$—1500 mmfd. | $R_4$—100K ohms | |
| $C_5$—2500 mmfd. | $R_5$—100K ohms | |
| $C_7$—.01 mfd. | $R_6$—47K ohms | | mH. = microHenry.

Figs. 2 and 3 illustrate the advantage which the above circuit has over conventional Q-meter circuits. For the purpose of illustration it is assumed a sample which absorbs 1% of the R. F. energy applied to the resonant circuit is being analyzed. The tube characteristic curve shown in Fig. 2 illustrates operating conditions for a detector tube in a vacuum tube voltmeter employed in a conventional Q-meter circuit. Under the conditions illustrated in Fig. 2, the control grid is biased near plate current cut-off 29. The resonant circuit output 30 with no R. F. energy absorption by the sample produces a detector tube plate current 31. The resonant circuit output 32 with 1% energy absorption produces detector tube plate current 33. It is apparent from this illustration that absorption of 1% of the R. F. energy absorbed produces a small change in plate current.

Fig. 3 illustrates operating conditions for the detector tube as used in the present invention. The control grid is biased at a value 34 far beyond detector tube plate current cut-off point 29. The resonant circuit output 35 with no R. F. energy absorbed is adjusted to produce the same plate current 31, as indicated in Fig. 2. The resonant circuit output 36 with 1% of the R. F. energy absorbed by the sample produces a plate current 37. It is apparent that the variation in plate current for the case illustrated in Fig. 3 is much greater than that produced under the conditions shown in Fig. 2, although the percentage of R. F. energy absorbed by the sample is the same.

The apparatus is operated as follows: a first calibrating sample containing a known concentration of the material which is to be measured is placed in the sample holder which conveniently is a glass test tube. The first calibrating sample should contain the minimum concentration of the material which is anticipated to be measured subsequently. The variable inductance is then tuned to produce resonance for the frequency being supplied from the radio frequency generator. This is easily accomplished by adjusting the variable inductance to give a maximum reading on the vacuum tube voltmeter. The most desirable frequency to use in the measurement will vary with the type of sample being analyzed. For example, my experiments have shown that a frequency of 10 megacycles is desirable in measuring a concentration of about $10^{-3}$ to $10^{-4}$ normality of hydrochloric acid in water, while a frequency of 1.5 megacycles is more suitable for detecting the presence of weaker solutions in the order of $10^{-6}$ normality. The power output from the radio frequency generator is then set to give a relatively large reading (preferably full scale deflection) on the vacuum tube voltmeter. The first calibrating sample is then removed from the sample holder and a second calibrating sample of higher but known concentration of the material is placed in the sample holder. For example, the sample could contain the highest concentration of material which is to be detected. Usually the second calibrating sample will not have the same effect on the resonant frequency of the resonant circuit 11 as the first calibrating sample, and the variable inductor $L_2$ is used to re-tune the circuit to the frequency of the R. F. generator. The second calibrating sample absorbs more radio frequency energy from the resonant circuit than the prior sample and causes the Q of the circuit to be lower, thus decreasing the reading of the vacuum tube voltmeter. If the first calibrating sample represents a minimum concentration of a material to be determined and the second calibrating sample represents the maximum of the material to be determined, then the difference between the two respective vacuum tube voltmeter readings should be as large as possible to obtain maximum accuracy for subsequent analyses of samples containing unknown concentrations of the material. If the initial setting of the circuit with the calibrating samples results in a spread of the vacuum tube voltmeter readings which is too small, it is increased by increasing the negative bias applied to the control grid of the detector tube. The above calibrating procedure is then repeated so that the power output of the radio frequency generator is set to produce a maximum voltmeter reading when the calibrating sample with the lowest concentration of material is again placed in the sample holder. The first calibrating sample is removed from the sample holder and the second calibrating sample is inserted in the sample holder. If the bias on the control grid of the vacuum tube voltmeter has been increased sufficiently, the spread of the voltmeter readings for the two calibration samples will be substantially full scale. If the spread in readings is too large, i. e., the voltmeter reading with the second calibrating sample is less than the lowest value provided on the voltmeter scale, the bias is too high, and the calibrating process must be repeated with a decreased bias on the control grid of the vacuum tube. In other words, by trial and error method using calibrating solutions of the desired concentration range of the material to be measured, the proper bias for the control grid of the vacuum tube voltmeter and the proper power output of the radio frequency generator can be determined to give a desired sensitivity. Once the desired sensitivity is obtained a complete calibration over the entire range of concentration to be measured is made by noting the voltmeter reading for additional calibrating samples of intermediate concentration, care being taken to retune the resonant circuit to the frequency of the R. F. generator each time a new calibrating sample is inserted in the sample holder. In this way the amount of R. F. energy absorbed in each of the calibrating samples is measured at a constant optimum frequency, i. e. the frequency of the R. F. generator.

The concentration of any unknown sample within the calibrating range is then readily determined by placing the unknown sample into the sample holder, tuning the resonant circuit to the frequency of the R. F. generator and comparing the vacuum tube voltmeter reading with the values obtained for the calibrating samples.

Although the preferred form of my invention is to power the circuit with batteries so that the apparatus is readily portable, the same type of measurement can be made with a circuit with a non-portable arrangement drawing its power supply from power lines. It should also be pointed out that similar analyses of samples can be made by placing the samples in the inductance of the resonant circuit and using a variable capacitor to tune the circuit as described above.

It should also be understood that the sample to be analyzed can be placed in inductive relationship with the resonant circuit either statically or dynamically. That is, the sample can be introduced and removed batchwise, or it can be continuously flowed through the space adapted to contain the sample. For example, the sample may be flowed continuously through a glass or plastic pipe which is disposed in inductive relationship with its capacitor.

My invention has the advantages that the sample is analyzed with a non-destructive method, and it is not necessary to make physical contact with the sample. This permits the analysis of the sample in a sealed container without altering either the container or the sample.

My invention is applicable as a chemical analysis method wherever it is desirable to determine the presence of minute quantities of materials which will absorb radio frequency energy. For example, my invention can be used:

1. As a continuous monitor on the purity of distilled water as delivered from the still.
2. For monitoring industrial processes involving the presence of materials capable of absorbing radio frequency energy.
3. For monitoring industrial process where the control of pH is important.
4. For determining the amount of decomposition undergone by chemical components which break down upon radiation with light, heat, ultra-violet X-ray, gamma ray or other radiation into materials which have a capacity for absorbing radio frequency energy different from that of the parent material.
5. For determining the end point in chemical titration work.

I claim:

1. In a circuit for measuring the amount of R. F. energy absorbed by a sample disposed in inductive relationship with a resonant circuit, the combination comprising an R. F. generator of variable power output, a resonant circuit connected to the output of the R. F. generator, means for tuning the resonant circuit, a vacuum tube voltmeter connected across the resonant circuit and having a control grid and a plate circuit, means for biasing the control grid of the vacuum tube to a negative value far beyond its normal cut-off bias, a current meter connected in the plate circuit of the tube, means for varying the power output of the R. F. generator and supplying the power to the resonant circuit to overcome the negative bias on the vacuum tube and cause plate current to pass through the meter to give a maximum reading with no sample present so that the plate current will decrease substantially when a sample which absorbs R. F. energy is placed in inductive relationship with the resonant circuit.

2. In a circuit for measuring the amount of R. F. energy absorbed by a sample from a capacitor, the combination comprising an R. F. generator of variable power output, a resonant circuit containing the capacitor connected to the output of the R. F. generator, means for tuning the resonant circuit, a vacuum tube voltmeter connected across the capacitor and having a control grid and a plate circuit, means for biasing the control grid of the vacuum tube to a negative value far beyond its normal cut-off bias, a current meter connected in the plate circuit of the tube, means for varying the power output of the R. F. generator and supplying the power to the resonant circuit to overcome the negative bias on the vacuum tube and cause plate current to pass through the meter to give a relatively large reading with no sample present in the capacitor so that the plate current will decrease substantially when a sample which absorbs R. F. energy is placed in inductive relationship with the capacitor.

3. In a circuit for measuring the amount of R. F. energy absorbed by a sample from an inductance, the combination comprising an R. F. generator of variable power output, a resonant circuit containing the inductance connected to the output of the R. F. generator, means for tuning the resonant circuit, a vacuum tube voltmeter connected across the inductor and having a control grid and a plate circuit, means for biasing the control grid of the vacuum tube to a negative value far beyond its normal cut-off bias, a current meter connected in the plate circuit of the tube, means for varying the power output of the R. F. generator and supplying the power to the resonant circuit to overcome the negative bias on the vacuum tube and cause plate current to pass through the meter to give a large reading with no sample present in the inductance so that the plate current will decrease substantially when a sample which absorbs R. F. energy is placed in inductive relationship with the inductance.

4. In a circuit for measuring the amount of R. F. energy absorbed by a sample disposed in inductive relationship with a resonant circuit, the combination comprising an R. F. generator of variable power output, a resonant circuit connected to the output of the R. F. generator, sample holding means disposed in the resonant circuit, means for tuning the resonant circuit, a vacuum tube voltmeter connected across the resonant circuit and having a control grid and a plate circuit, means for biasing the control grid of the vacuum tube to a negative value far beyond its normal cut-off bias, a current meter connected in the plate circuit of the tube, means for varying the power output of the R. F. generator and supplying the power to the resonant circuit to overcome the negative bias on the vacuum tube and cause plate current to pass through the meter to give a maximum reading with no sample present so that the plate current will decrease substantially when a sample which absorbs R. F. energy is placed in inductive relationship with the resonant circuit.

5. In a circuit for measuring the amount of R. F. energy absorbed by a sample from a capacitor, the combination comprising an R. F. generator of variable power output, a resonant circuit containing the capacitor connected to the output of the R. F. generator, sample holding means disposed in the capacitor, means for tuning the resonant circuit, a vacuum tube voltmeter connected across the capacitor and having a control grid and a plate circuit, means for biasing the control grid of the vacuum tube to a negative value far beyond its normal cut-off bias, a current meter connected in the plate circuit of the tube, means for varying the power output of the R. F. generator and supplying the power to the resonant circuit to overcome the negative bias on the vacuum tube and cause plate current to pass through the meter to give a relatively large reading with no sample present in the capacitor so that the plate current will decrease substantially when a sample which absorbs R. F. energy is placed in inductive relationship with the capacitor.

6. In a circuit for measuring the amount of R. F. energy aborbed by a sample from a capacitor, the combination comprising an R. F. generator capable of variable power output, a resonant circuit containing the capacitor connected to the output of the R. F. generator, sample holding means disposed in the capacitor, means for tuning the resonant circuit, a vacuum tube voltmeter connected across the capacitor and having a control grid and plate circuit, means for biasing the control grid of the vacuum tube to a negative value of the order of ten times its normal cut-off bias, a current meter connected in the plate circuit of the tube, means for varying the power output of the R. F. generator and supplying the power to the resonant circuit sufficient to overcome the negative bias on the vacuum tube and cause plate current to pass through the meter to give a relatively large reading with no sample present in the capacitor so that the plate current will decrease substantially when the sample which absorbs R. F. energy is placed in the sample holder.

7. In a circuit for measuring the amount of R. F. energy absorbed by a sample disposed in inductive relationship with a resonant circuit, the combination comprising an R. F. generator of variable power output, a resonant circuit connected to the output of the R. F. generator, means for tuning the resonant circuit, means for continuously flowing the sample through an inductive relationship with the resonant circuit, a vacuum tube voltmeter connected across the resonant circuit and having a control grid and a plate circuit, means for biasing the control grid of the vacuum tube to a negative value far beyond its normal cut-off bias, a current meter connected in the plate circuit of the tube, means for varying the power output of the R. F. generator and supplying the power to the resonant circuit to overcome the negative bias on the vacuum tube and cause plate current to pass through the meter to give a maximum reading with no sample present so that the plate current will decrease substantially when a sample which absorbs R. F. energy is placed in inductive relationship with the resonant circuit.

8. In a circuit for measuring the amount of R. F. energy absorbed by a sample disposed in inductive relationship with a resonant circuit, the combination comprising an R. F. generator of variable power output, a variable inductor and a capacitor forming the resonant circuit connected to the R. F. generator output, a vacuum tube voltmeter connected across the capacitor and having a control grid and a plate circuit, means for biasing the control grid to a negative value far beyond its normal cut-off bias, a current meter connected in the plate circuit, means for varying the power output of the R. F. generator sufficient to overcome the negative bias on the vacuum tube and cause plate current to pass through the current meter to give a large reading with no sample present so that the plate current will decrease substantially when a sample which absorbs R. F. energy is placed in inductive relationship with the capacitor.

References Cited in the file of this patent

UNITED STATES PATENTS

| | | |
|---|---|---|
| 2,231,035 | Stevens et al. | Feb. 11, 1941 |
| 2,602,838 | Boisblanc et al. | July 8, 1952 |